UNITED STATES PATENT OFFICE.

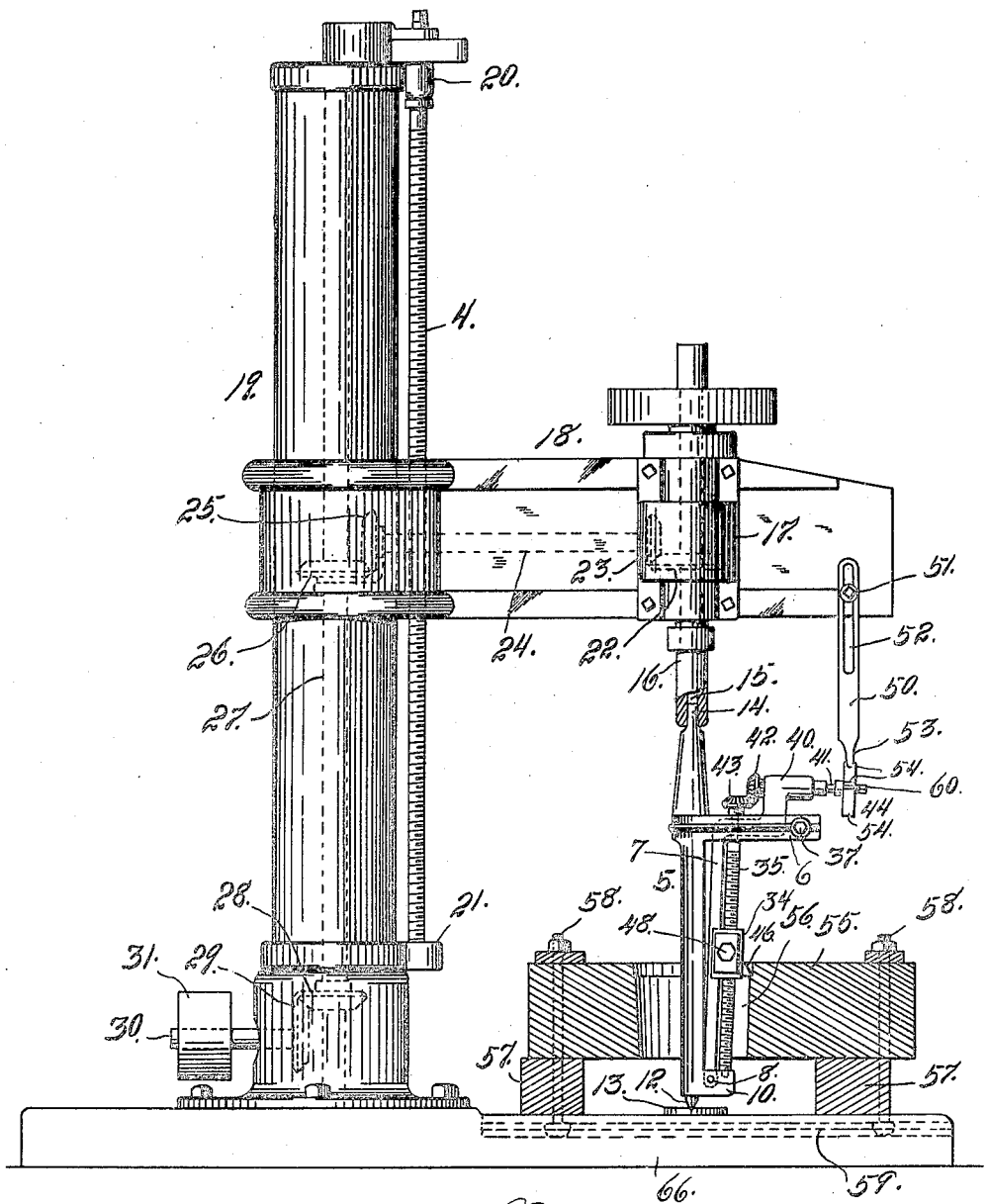

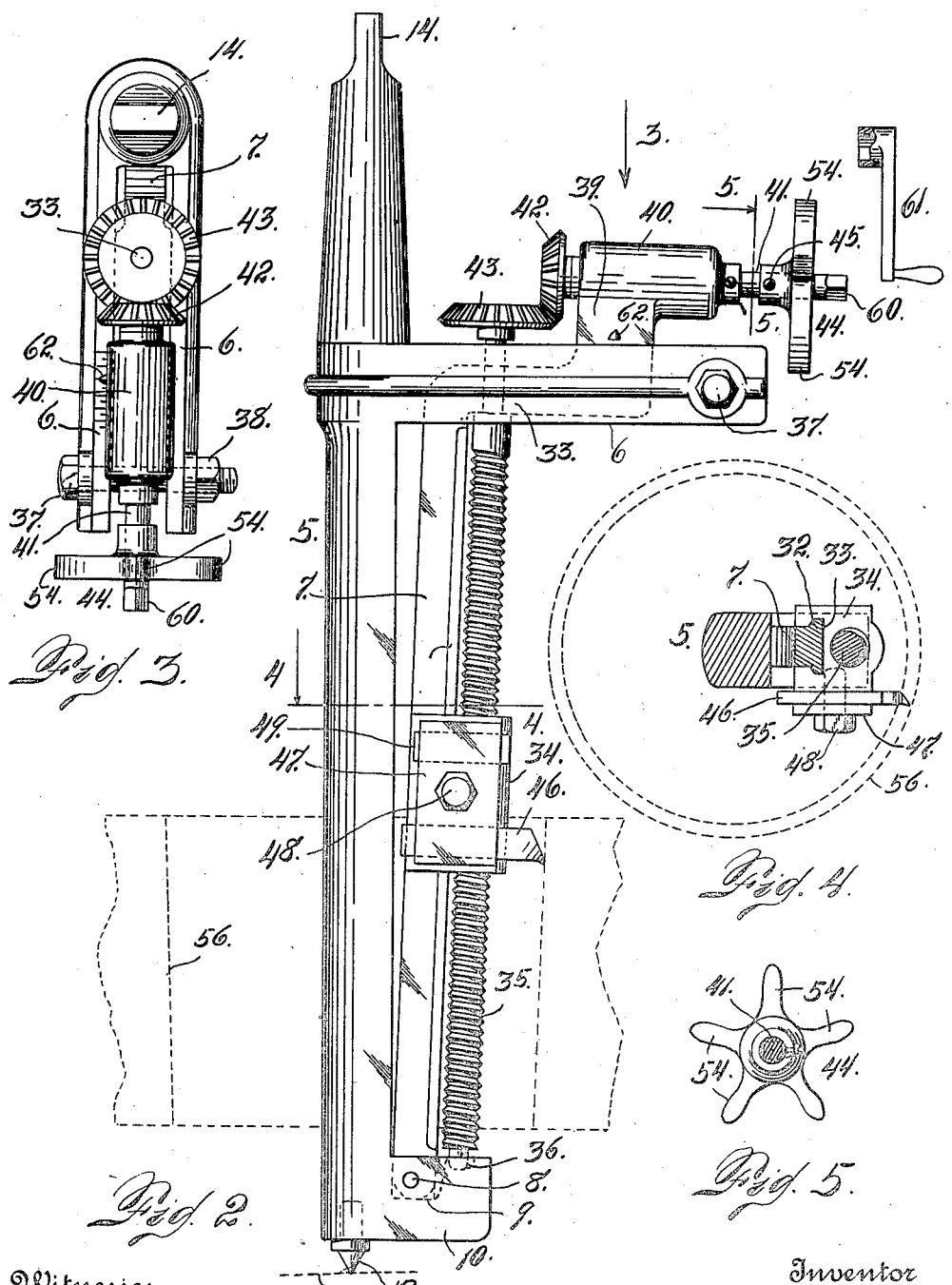

FRANK W. CURTIS, OF DENVER, COLORADO.

TAPER-BORING BAR.

1,091,914.  Specification of Letters Patent.  Patented Mar. 31, 1914.

Application filed June 7, 1913. Serial No. 772,307.

*To all whom it may concern:*

Be it known that I, FRANK W. CURTIS, a citizen of the United States, residing in the city and county of Denver and State of Colorado, have invented certain new and useful Improvements in Taper-Boring Bars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in tools adapted for use in boring or forming taper holes, and includes a radially movable bar, in which is journaled a feed screw carrying a nut, in which the boring tool is mounted, the radial bar, screw and tool being adjustable according to the taper or incline required for the wall of the hole. Provision is also made for automatically actuating the feed screw during the reaming operation. It may be assumed that originally the hole acted upon by this tool is cylindrical, the object of my present improvement being by reaming or cutting out the hole to give its wall the desired incline or taper, resulting from a correspondingly inclined position given to the radial bar upon which the tool is mounted, whereby a comparatively deep cut or bite is taken by the tool at one end of the hole, the said cut or bite gradually diminishing in degree toward the opposite end of the hole.

Any suitable means may be employed for imparting the rotary movement to my improved device. As illustrated in the drawing, the device is connected with a horizontally disposed chuck carried by a stationary column, the chuck being provided with a rotary member connected in operative relation with my improved device, the rotary movement of the said chuck member being imparted through the instrumentality of shafts and gears suitably arranged for the purpose.

Having briefly outlined my improved construction, I will proceed to describe same in detail, reference being made to the accompanying drawing, in which is illustrated an embodiment thereof.

In this drawing—Figure 1 is an elevation, partly in section, showing my improvement connected in operative relation and in position for use. Fig. 2 illustrates the device in detail and on a larger scale. Fig. 3 is a top plan view of the device or a view looking in the direction of arrow 3, Fig. 2. Fig. 4 is a section taken on the line 4—4, Fig. 2, looking downwardly. Fig. 5 is a section taken on the line 5—5, Fig. 2, looking toward the right.

The same reference characters indicate the same parts in all the views.

Let the numeral 5 designate a vertically disposed frame member, whose upper portion is provided with a pair of clamping jaws 6, spaced to receive the upper extremity of a bar 7, pivoted, as shown at 8, to have a radial movement in a socket 9 formed in a horizontal projection 10, at the bottom of the frame member 5. The lower extremity of this frame member is equipped with a cone-shaped member 12, adapted to engage a stationary part 13, when the device is in use, while the upper extremity 14 of the frame member is adapted to enter a socket 15, formed in the rotary member 16 of a chuck 17, carried by a horizontal arm 18, vertically movable on a stationary column 19, and adjustable thereon for such vertical movement through the instrumentality of a feed screw 4, engaging a nut formed in the arm adjacent the column, the said feed screw 4 being journaled at the top and bottom in bearings 20 and 21, or in any other suitable manner. The rotary member 15 of the chuck carries a gear 22, meshing with a gear 23 fast on a horizontally-disposed shaft 24, journaled in the arm 17 and carrying at its opposite extremity a gear 25, meshing with a similar gear 26 mounted on the upper extremity of a shaft 27, whose lower extremity is provided with a gear 28 meshing with a similar gear 29 fast on a shaft 30, carrying an exposed operating wheel 31. The construction just described and illustrated in Fig. 1 of the drawing, is one suitable means for operating the rotary member of a chuck for imparting the rotary movement to my improved device for reaming out a hole to give its wall a suitable taper or inclination, as heretofore explained.

The pivoted bar 7 has one of its longitudinal edges of dove-tailed shape, as shown at 32, to engage a socket 33 of counterpart shape, formed in a nut 34, in which a feed screw 35 is threaded, the said feed screw being pivoted at its lower extremity, as shown at 36, and journaled at its upper extremity in the horizontally-disposed part 33 of the bar 7, the said part 33 passing between the clamping jaws 6 of the frame member 5, the upper extremity of the bar 7 and its connections being held in the desired position of adjustment between the said jaws by means of a bolt 37 passing through registering openings formed in the said jaws and being secured by a nut 38. The outer extremity of the part 33 of the bar 7 extends upwardly beyond the clamping jaws 6, as shown at 39, and merges into a bearing 40, in which is journaled a short shaft 41, having a gear 42 at one extremity, the said gear meshing in a similar gear 43, fast on the upper extremity of the feed screw 35. The extremity of the shaft 41 opposite the gear 42 is equipped with a star wheel 44, which is made fast thereon by means of a set screw 45, or in any other suitable manner. By virtue of this construction, provision is made for imparting intermittent rotary movement to the feed screw during the reaming operation of the cutting tool 46, which is clamped to one side of the nut 34, by means of a plate 47, the latter being held in place by means of a cap screw 48, passed through registering openings formed in the plate 47 and the tool 46, the screw entering a threaded socket formed in the nut. An auxiliary filler plate 49 is also interposed between the plate 47 and the nut, above the tool 46, in order to maintain the clamping plate parallel with the adjacent wall of the nut.

Suspended from the horizontal arm 18 is a vertically adjustable member 50, which is secured to the said arm by a set bolt 51, passing through a slot 52 formed in the member 50 and threaded into the arm 18. The lower extremity 53 of this member 50 occupies a position in the path of the projections 54 of the star-wheel 44, whereby, as the frame member 5 and its connections are rotated during the reaming operation, the member 50 will engage the star-wheel during each revolution of the structure and impart a partial rotation to the feed screw 35, by virtue of the shaft-and-gearing connection between the star-wheel and the screw, as heretofore explained.

From the foregoing description, the use and operation of my boring bar construction will be readily understood. It may be assumed that the part 55 containing an opening 56 is suitably supported on separated members 57 held in place by bolts 58, whose heads enter a groove 59 formed in the stationary base 66 upon which the column 19 is mounted. The lower portion of the framework of my improved device is passed through the opening 56 and its cone-shaped member 12 is caused to engage a stationary plate 13, or any other suitable support. The upper extremity 14 of the device is inserted in the socket 15 of the rotary member 16 of the chuck. The upper extremity of the bar 7 is then adjusted between the jaws 6 to give the bar 7 and its attachments the necessary inclination according to the degree of taper which is to be given the wall of the opening 56 upon which the tool is to act. The tool is then rotated by imparting rotary movement to the part 16 of the chuck through the instrumentality of the connections heretofore described, in which event the shaft 30 will be rotated by connecting the wheel 31 with any suitable motor or prime mover. During the operation of the frame member 5 and its connections, the cutting tool 46 acts upon the inner wall of the opening 56 to give the said wall the desired taper, the tool gradually moving downwardly with the nut 34 by virtue of the action of the member 50 on the star-wheel 44 and the connection of the latter with the feed screw 35, as heretofore explained.

In order to manually rotate the feed screw 35 for the purpose of quickly moving the same upon the screw from its lowermost to an upper position, a removable crank 61 may be employed, the said crank having a socket to receive the squared extremity 60 of the shaft 41, the said extremity extending beyond the star-wheel for the purpose.

One of the jaws 6 may be graduated as a guide during the adjustment of the bar 7 to give the latter the desired inclination, in order to insure accuracy in the degree of adjustment, and to facilitate this operation the upper part 39 of the bar 7 is equipped with a projection 62, which extends above the graduated part of the jaw.

I claim—

1. The combination of a frame member rotatably mounted, a bar pivoted thereon and arranged to occupy a position inclined to the axis of the frame member, a feed screw having one extremity journaled in said bar and its opposite extremity in the frame member and whose axis is parallel with the bar, a nut slidable longitudinally on the bar and having a threaded connection with the feed screw, a cutting tool carried by the nut, means for rotating the frame member and its connections on the axis of the frame member, and independent means for rotating the feed screw on its own axis.

2. The combination of a frame member rotatably mounted and having laterally projecting clamping jaws, a bar pivoted on the frame member at one extremity, its opposite extremity passing through the jaws and adjustable therein to cause it to occupy positions of varying inclination to the axis of the frame member, a feed screw pivoted on the frame member at one extremity, its opposite extremity being journaled in the adjacent part of the bar which is bent approximately at right angles to its body portion, a nut slidable on the bar and threaded on the screw, means for imparting rotary movement to the frame member and means for simultaneously imparting intermittent rotary movement to the screw on its own axis.

3. The combination of a frame member rotatably mounted, a bar pivoted at one extremity on the said member and adjustable to occupy positions of varying inclination to the axis of the frame member, the latter having laterally projecting jaws between which the bar is locked in the desired position of adjustment, a screw pivoted on the frame member at one extremity and journaled in the bar at its opposite extremity to maintain its axis parallel with the body of the bar, a nut slidable on the bar and threaded on the screw, a shaft journaled in the bar and having a star-wheel, an operative connection between the shaft and screw for rotating the latter, means for rotating the frame member, and a stationary part arranged in the path of the star-wheel to impart rotary movement to the latter and to the screw on its own axis during the rotation of the frame member on its axis.

4. The combination of a frame member rotatably mounted, a bar pivoted at one extremity of said member and adjustable to occupy positions of varying inclination, to the axis of the frame member, the latter having laterally projecting jaws between which the bar is locked in the desired position of adjustment, a screw pivoted on the frame member at one extremity and journaled in the bar at its opposite extremity to maintain its axis parallel with the body of the bar, a nut slidable upon the bar and threaded by the screw, means for imparting rotary movement to the frame member, and means for simultaneously imparting intermittent rotary movement to the screw on its own axis.

In testimony whereof I affix my signature in presence of two witnesses.

FRANK W. CURTIS.

Witnesses:
  A. J. O'BRIEN,
  E. M. WAUDBY.